United States Patent [19]

Marvell et al.

[11] Patent Number: 5,735,656
[45] Date of Patent: Apr. 7, 1998

[54] SELF-SEALING THROUGH ADJUSTOR

[75] Inventors: Michael D. Marvell; Adam W. Solberg, both of Rockford, Ill.

[73] Assignee: Textron Inc., Providence, R.I.

[21] Appl. No.: 575,100

[22] Filed: Dec. 19, 1995

[51] Int. Cl.[6] .................... F16B 35/00; F16B 35/06; B60Q 1/06
[52] U.S. Cl. .................... 411/366; 411/399; 411/938; 362/66
[58] Field of Search .................... 411/308, 309, 411/324, 338, 339, 366, 399, 938; 362/66

[56] References Cited

U.S. PATENT DOCUMENTS

| | | | |
|---|---|---|---|
| 2,733,335 | 1/1956 | Falge | 411/366 X |
| 3,339,952 | 9/1967 | Beckman | 411/339 X |
| 3,396,996 | 8/1968 | Raptis | 411/399 X |
| 3,752,032 | 8/1973 | Fiddler | 411/366 |
| 5,454,676 | 10/1995 | Conte | 411/399 X |

*Primary Examiner*—Neill R. Wilson
*Attorney, Agent, or Firm*—Trexler, Bushnell, Giangiorgi & Blackstone, Ltd.

[57] ABSTRACT

A novel, self-sealing a headlamp adjustor mechanism is used to effect pivotal movement of a movable headlamp component in a headlamp arrangement. The headlamp adjustor mechanism includes a bushing having an initially unthreaded bore therethrough and an adjusting screw member having a shank. The shank of the adjusting screw member has a threaded portion and an unthreaded portion. When the adjusting screw member is rotated through the bore, female threads are cold-formed within the bore as the threaded portion contacts the bore and the cold-formed, female threads are deformed and collapsed against the unthreaded portion to seal the bushing against the unthreaded portion as the unthreaded portion contacts the cold-formed threads in the bore.

11 Claims, 3 Drawing Sheets

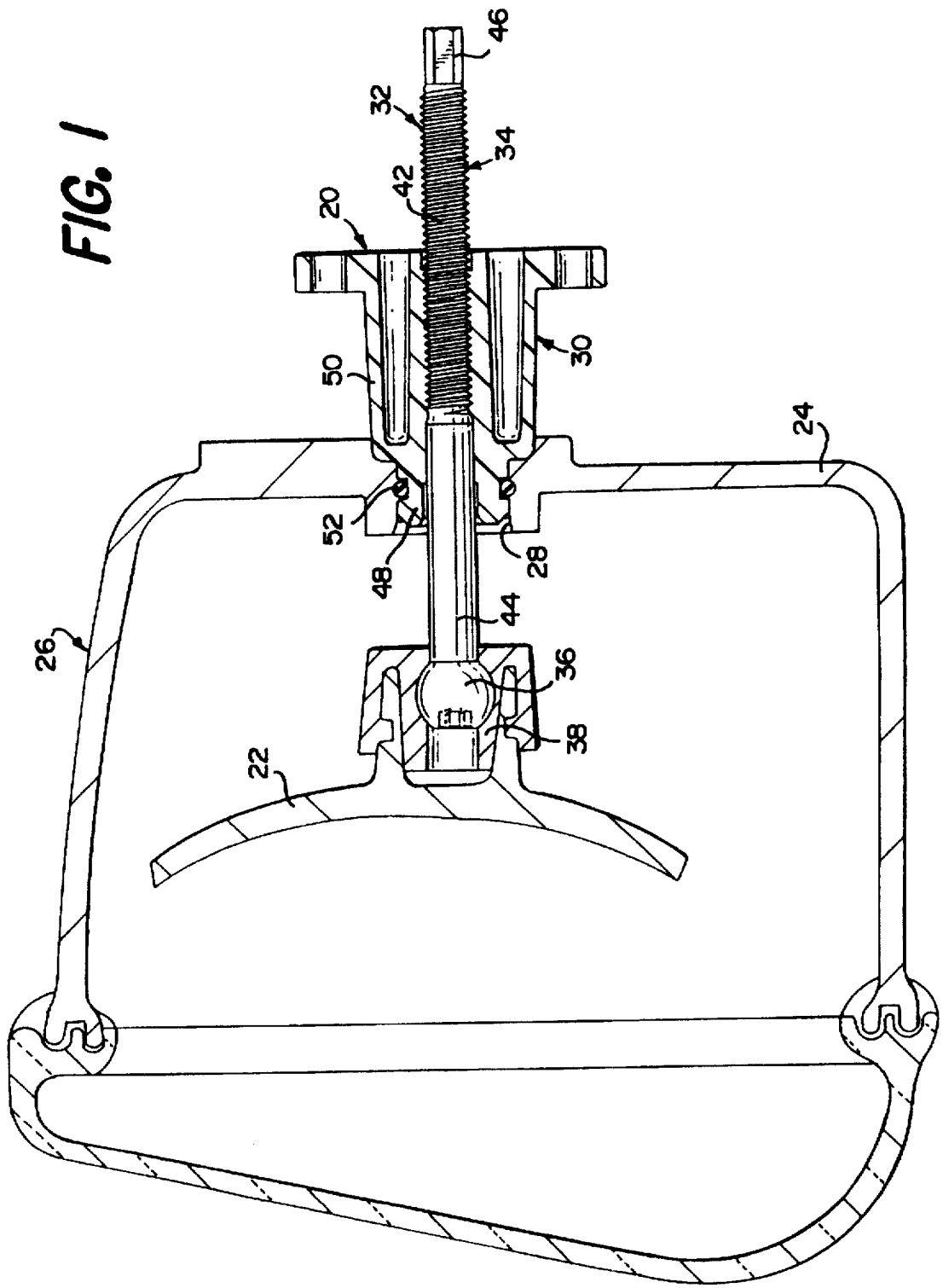

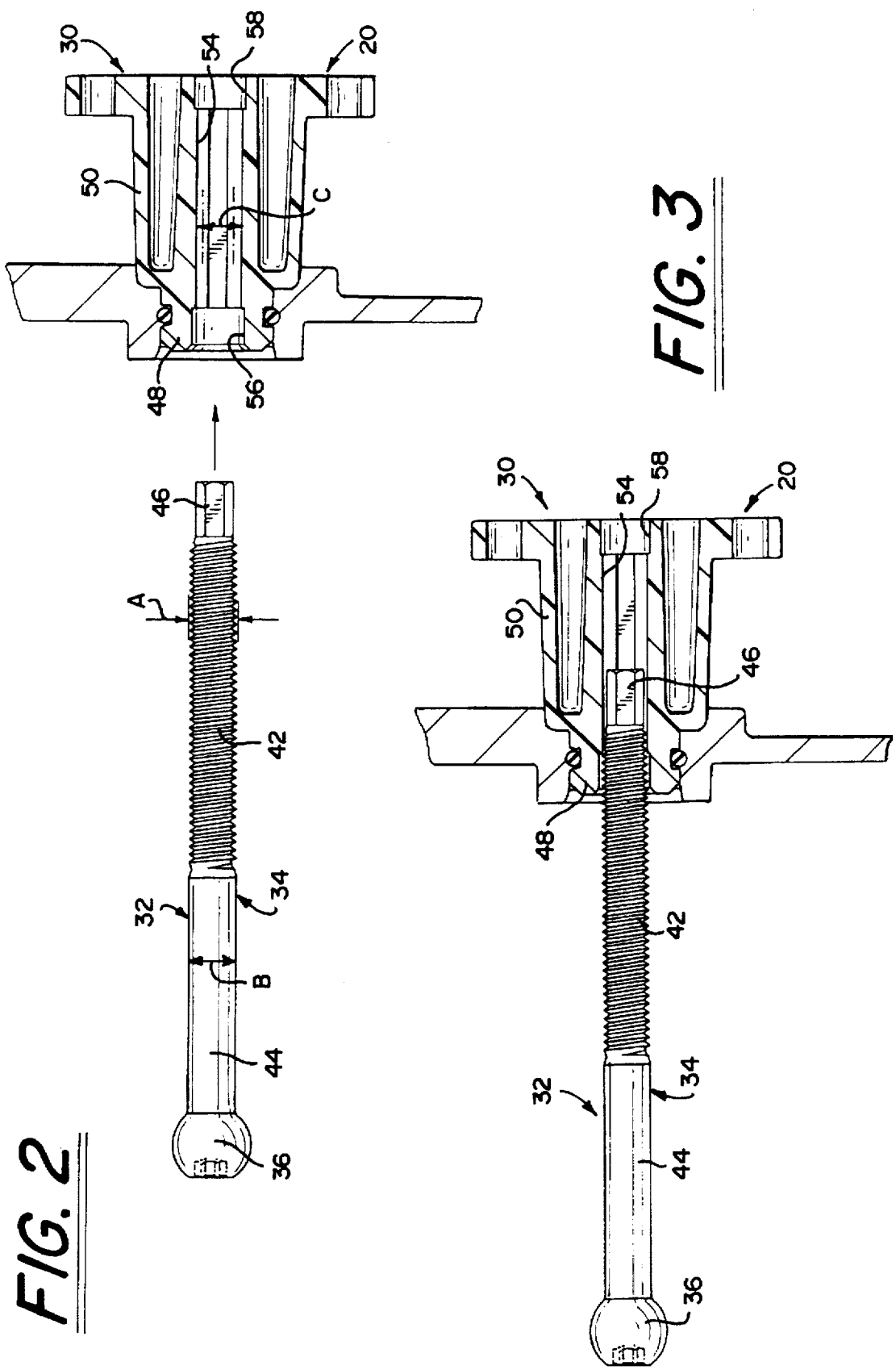

SELF-SEALING THROUGH ADJUSTOR

BACKGROUND OF THE INVENTION

This invention is generally directed to a novel, self-sealing through adjustor mechanism which is used to adjust the aiming of a movable headlamp component, such as a reflector member or the like, within a sealed stationary headlamp component which forms part of a headlamp arrangement for an automobile. More particularly, the invention contemplates a self-sealing through adjustor mechanism which is formed of a bushing and an adjusting screw member that is positioned within a bore through the housing. The adjusting screw member seals with the bushing as the adjusting screw member passes therethrough to prevent the entrance of air and/or contaminates, such as dirt and/or moisture, through the bore and into the interior of the headlamp arrangement.

In order to ensure that the headlamp arrangement functions properly, air and/or contaminants, such as dirt and/or moisture, must be deterred from entering into the interior of the stationary headlamp component. If the air and/or contaminants gain entrance into the interior of the headlamp arrangement, the air and/or contaminants can interfere with the workings of the headlamp arrangement thereby causing the headlamp arrangement to function improperly or not at all.

Commonly, when a movable reflector is provided to adjust the aiming of the headlamp beam, a headlamp adjustor mechanism is used. The headlamp adjustor mechanism is provided through an opening in the stationary headlamp component in which the movable reflector is housed. The headlamp adjustor mechanism is sealed to the stationary headlamp component.

The headlamp adjustor mechanism includes a bushing having an axial bore therethrough and an adjusting screw member. The adjusting screw member is engaged through the bore and is rotatable relative thereto. With prior art designs, in order to seal the bore and prevent the entrance of air and/or contaminants through the bore which would allow the air and/or contaminants to enter into the stationary component, a sealant in the form of a patch, or the like, is applied to the threads of the adjusting screw member. The application of the sealant to the adjusting screw member increases the cost of the headlamp adjustor mechanism due to the need for the extra component and the labor used to properly apply the sealant.

Thus, there is a need to provide a headlamp adjustor mechanism which eliminates the application of a sealant to the threads of the adjusting screw member. The present invention provides a novel solution to this problem and presents several other improvements and advantages which will become apparent upon a reading of the attached specification.

OBJECTS AND SUMMARY OF THE INVENTION

A general object of the present invention is to provide a self-sealing through adjustor mechanism which is used to adjust the positioning of a movable headlamp component, namely, a reflector, in a headlamp arrangement for an automobile.

Another general object is to provide a self-sealing headlamp through adjustor mechanism having a bushing and a partially threaded adjusting screw member, wherein the adjusting screw member is sealed to the bushing as the adjusting screw member passes through the bushing thereby eliminating the need to apply a sealant to the threads of the adjusting screw member.

Briefly, and in accordance with the foregoing, the present invention discloses a novel, self-sealing headlamp adjustor mechanism for effecting pivotal movement of a movable headlamp component in a headlamp arrangement for an automobile. The headlamp adjusting mechanism includes a bushing and an adjusting screw member which is engaged within the bushing.

The bushing is made of a suitable material, preferably plastic, and has an initially unthreaded, hexagonal-shaped bore therethrough. The bore is of a predetermined length and has a predetermined inner diameter which is defined by an inner wall.

The adjusting screw member has an elongated shank which has a ball portion at one end. The ball portion is engaged within a socket formed in the movable headlamp component. The shank has a threaded portion and an unthreaded portion. The threaded portion has a predetermined crest diameter, pitch diameter and root diameter. The unthreaded portion has a predetermined outer diameter.

Prior to assembly of the adjusting screw member with the bushing, the bore in the bushing is unthreaded. To seal the bore through the bushing to prevent the entrance of air and/or contaminants, such as dirt and/or moisture, through the bore and into the interior of the headlamp arrangement, the novel headlamp adjustor mechanism of the present invention seals the bore as the adjusting screw member is engaged with the bushing.

As the adjusting screw member is rotated through the bore in the bushing, internal, female threads are cold-formed within the bore by the external or male threaded portion of the shank as it comes into contact with the bore. The inner diameter of the bore is such that internal, female threads are formed when the external or male threaded portion contacts the inner wall of the bore. As the unthreaded portion contacts the previously cold-formed internal threads in the bore, the cold-formed internal threads are deformed and collapsed against the unthreaded portion of the shank to tightly seal the bushing against the unthreaded portion. The unthreaded shank portion has a diameter which is sufficiently great enough relative to the cold-formed, internal threads to deform and collapse the cold-formed, internal threads in the bore as the unthreaded portion contacts the threads. This closes off or seals the bore and seals the bushing against the unthreaded portion of the adjusting screw member thereby preventing a passageway for air and/or contaminants through the bushing and into the interior of the stationary component.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a view of a novel, self-sealing headlamp adjustor mechanism shown partially in cross-section which incorporates the features of the invention and which is shown in its environment being engaged with a sealed headlamp arrangement, such headlamp arrangement being shown in cross-section, wherein the headlamp adjustor mechanism is comprised of a bushing and an adjusting screw member, such adjusting screw member having a threaded shank portion and an unthreaded shank portion;

FIG. 2 is an exploded view of the headlamp adjustor mechanism which is shown partially in cross-section;

FIG. 3 is a partially assembled view of the headlamp adjustor mechanism, which is shown partially in cross-section, wherein the threads on the adjusting screw member are engaged with an initially unthreaded bore through the bushing to cold-form threads in the bore;

DETAILED DESCRIPTION OF THE PREFERRED EMBODIMENT

Figure 4:
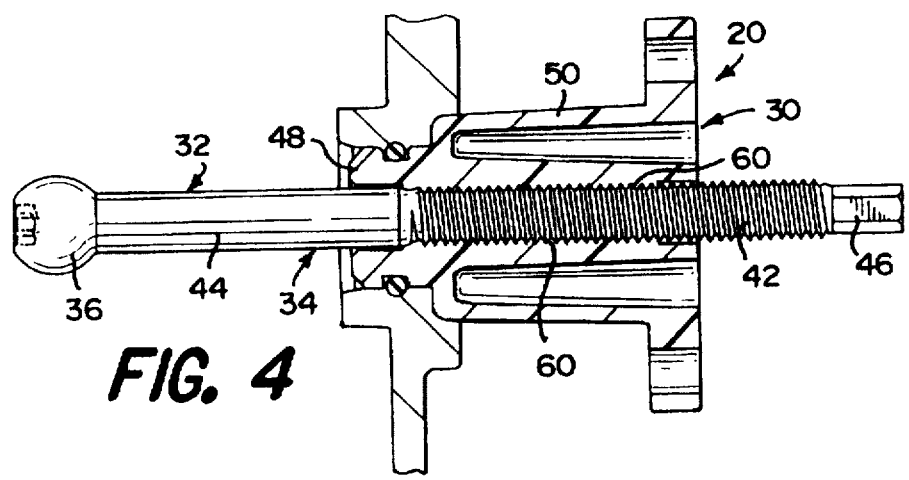
FIG. 4 is a partially assembled view of the headlamp adjustor mechanism, which is shown partially in cross-section, wherein threads have been cold-formed along the length of the bore.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention presents a novel, self-sealing through headlamp adjustor mechanism 20 which is used to adjust the aiming of a movable headlamp component 22, such as a reflector member or the like, which is housed in a sealed stationary component 24 of a headlamp arrangement 26 for an automobile. The headlamp adjustor mechanism 20 is assembled to and inserted through an opening 28 in the rear side of the stationary component 24. An adjustor mechanism 20 adjusts the movable component 22 in a horizontal direction, while another similar adjustor mechanism is used to adjust the movable component 22 in a vertical direction (not shown).

The novel headlamp adjustor mechanism 20 is generally comprised of a bushing 30 and an adjusting screw member 32. The adjusting screw member 32 is engaged with the movable component 22 of the headlamp arrangement 26. The adjusting screw member 32 seals with the bushing 30 as it is engaged therewith to prevent the passage of air and/or contaminants, such as dirt and/or moisture through the bushing 30 and into the interior of the headlamp arrangement 26.

The adjusting screw member 32 is comprised of an elongated shank 34 with a ball portion 36 at an end. The shank 34 of the adjusting screw member 32 has a threaded portion 42 and an unthreaded portion 44.

The ball portion 36 of the adjusting screw member 32 is disposed in a socket 38 formed on the movable component 22. The ball portion 36 and the socket 38 are complementarily shaped.

The unthreaded portion 44 of the shank 34 begins beneath the ball portion 36 and extends a predetermined length. The remainder of the adjusting screw member 32 is threaded with the exception of an unthreaded end portion 46 of the screw member 32 which is opposite to the ball end of the screw member 32. The end portion 46 of the screw member 32 can be threaded if the application so requires it.

The threaded portion 42 of the elongated shank 34 has external or male threads thereon that have a predetermined crest diameter A (shown in FIG. 2), pitch diameter and root diameter. The unthreaded portion 44 of the elongated shank 34 is cylindrical-shaped, smooth and has a predetermined outer diameter B (shown in FIG. 2).

The bushing 30 is made of a suitable material and is preferably made of plastic by appropriate manufacturing methods such as molding and the like. The bushing 30 is generally comprised of a nose portion 48 and a base 50.

The nose portion 48 of the plastic bushing 30 is inserted through the opening 28 in the stationary component 24 of the headlamp arrangement 26. An O-ring 52 is used to seal the junction between the nose portion 48 of the headlamp adjustor mechanism 20 and the stationary component 24 to prevent the passage of air and/or contaminants, such as dirt and/or moisture, through the junction. It is envisioned that the bushing 30 may be sealed and attached to the stationary component 24 of the headlamp arrangement 26 by other suitable means that one of ordinary skill in the art could devise to prevent the passing of air and/or contaminants through the junction.

The plastic bushing 30 has an axial bore 54 extending therethrough having an inner diameter C (shown in FIG. 2) which is defined by an inner wall. Prior to assembly of the adjusting screw member 32 with the plastic bushing 30, the inner diameter C of the bore 54 is less than the crest diameter A of the threaded shank portion 42. In addition, preferably, prior to assembly of the adjusting screw member 32 with the plastic bushing 30, the axial bore 54 is hexagonal-shaped.

A countersunk passage 56 is provided at a first end of the axial bore 54 to enable the adjusting screw member 32 to be easily inserted into the bore 54 for assembly of the adjusting screw member 32 with the bushing 30. A like countersunk passage 58 is provided at a second, opposite end of the bore 54. Each countersunk passage 56, 58 has a diameter which is greater than the crest diameter A of the threaded shank portion 42 and greater than the outer diameter B of the unthreaded shank portion 44 of the adjusting screw member 32.

As shown in FIG. 2, before the assembly of the adjusting screw member 32 with the bushing 30, the inner wall of the bore 54 is smooth and unthreaded. To seal the bore 54 so that air and/or contaminants, such as dirt and/or moisture, cannot pass through the bore 54 which could allow the air and/or contaminants to enter into the interior of the stationary headlamp component 24 which could possibly interfere with the workings of the movable reflector 22, the adjusting screw member 32 is passed through the axial bore 54 in the bushing 30.

When the threaded shank portion 42 of the adjusting screw member 32 passes through the bushing 30, the threaded shank portion 42 contacts the inner wall of the bore 54 and the external or male threads on the threaded shank portion 42 creates or cold-forms female, internal threads 60 in the inner wall of the bore 54 as it passes through the bore 54. Thereafter, as the unthreaded shank portion 44 passes through the bore 54, the unthreaded shank portion 44 deforms and collapses a portion of the previously formed internal threads 60 so that the collapsed threads 62 abut and seal against the unthreaded shank portion 44. When the threads of the portion 62 collapse, the threads 62 bend and abut or engage against each other, as well as the cylindrical surface of unthreaded portion 44. Therefore, the inner diameter C of the bore 54 must be sufficiently small enough to allow the formation of the internal threads 60 when the threaded shank portion 42 contacts the inner wall of the bore 54 and must be sufficiently small to allow the internal threads 60 to be deformed and collapsed (shown as collapsed threads 62) when contacted by the unthreaded shank portion Specifically, to seal the through adjustor mechanism 20 of the present invention, the unthreaded end portion 46 of the elongated shank 34 is engaged within the countersunk passage 56 in the nose portion 48 of the bushing 30. The countersunk passage 56 provides for the easy insertion of the end portion 46 of the shank 34 therein. When the threaded portion 42 of the shank 34 contacts the point of the axial bore 54 where the inner diameter C of the bore 54 is less than the crest diameter A of the threaded shank portion 42, the shank 34 is rotated or driven into the bore As shown in FIG. 3, rotation of the shank causes the male or external threads on the threaded shank portion 42 to screw into the inner wall of the bore 54 thereby creating or cold-forming complementary internal, female threads 60 in the inner wall of the bore 54. The internal female threads 60 define an internal or crest diameter which is equal to the distance between opposite thread peaks. Therefore, the inner diameter C of the unthreaded bore 54 is sufficiently less than the crest diameter A of the threaded shank portion 42 such that female threads 60 are formed within the inner wall of the bore 54 as the threaded shank portion 42 contacts the bore 54. The cold-forming of the female threads 60 sets up a frictional degree of prevailing torque in the system and insures a tight fit between the bore 52 and the threaded shank portion 42 so that the shank 34 will not easily vibrate out of place during operation of the automobile. The hexagonal shape of the bore 54 assists in the creation of the internal, female threads 60 within the bore 54 because sufficient room is provided within the bore 54 for the plastic material to be moved around.

Figure 5:
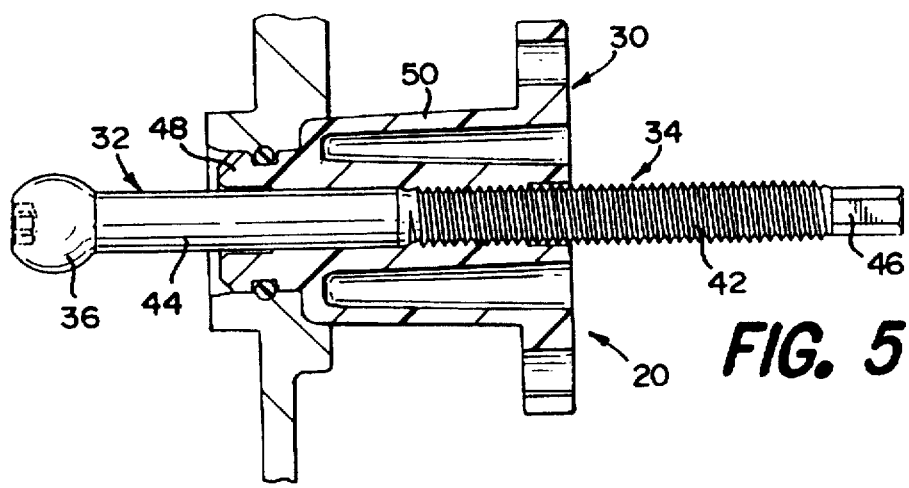
FIG. 5 is a fully assembled view of the headlamp adjustor mechanism, which is shown partially in cross-section, wherein a portion of the cold-formed threads within the bore are deformed and collapsed against the unthreaded shank portion of the adjusting screw member to tightly seal the bore.
Figure 6:
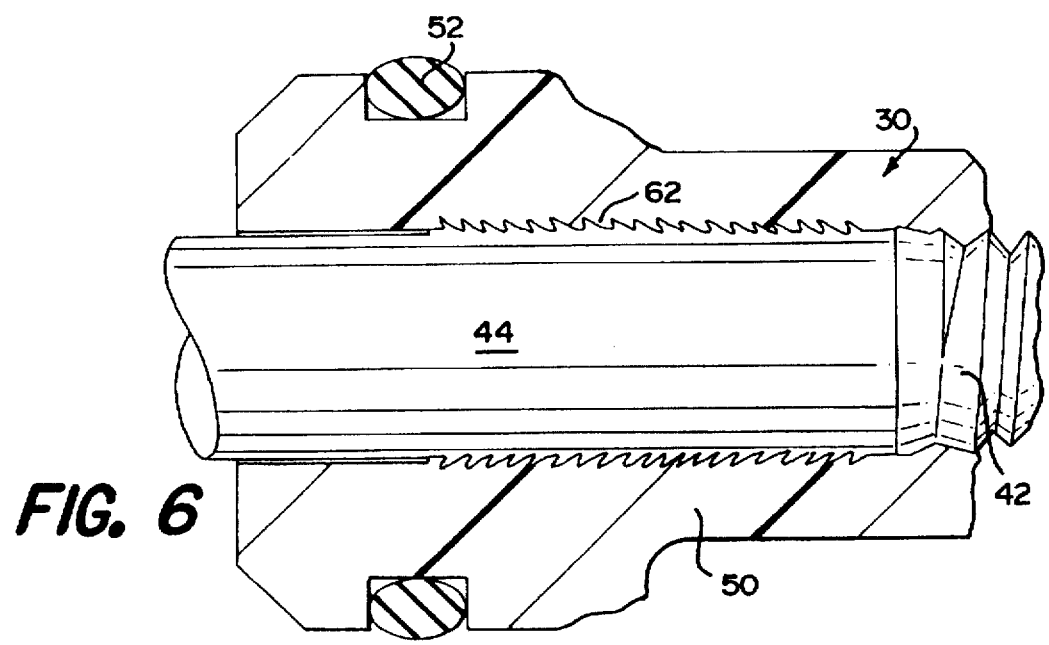
FIG. 6 is a fragmented, enlarged view of the headlamp adjustor mechanism, which is shown partially in cross-section, wherein a portion of the cold-formed threads within the bore are deformed and collapsed against the unthreaded shank portion of the adjusting screw to tightly seal the bore.

As the adjusting screw member 32 continues to traverse through the bushing 30 as it is being driven through the bushing 30, the unthreaded shank portion 44 eventually runs up against the cold-formed threads 60. The outer diameter B of the unthreaded shank portion 44 is sufficiently greater than the internal or crest diameter of the female threads 60 in the bore 54 so that, as the unthreaded shank portion 44 is driven through the bushing 30, the unthreaded shank portion 44 deforms and collapses the female, cold-formed threads (shown as collapsed threads 62) formed by the threaded shank portion 42 against the unthreaded shank portion 44 as shown in FIG. 5 and as most clearly illustrated in the enlarged view shown in FIG. 6. When the threads of the portion 62 collapse, the threads 62 bend and abut or engage against each other, as well as the cylindrical surface of unthreaded portion 44. Therefore, the outer diameter B of the unthreaded shank portion 44 is sufficiently greater than the inner or crest diameter of the threads 60 in the bore 54, such that when the unthreaded shank portion 44 contacts the threads 60, the threads collapse against the unthreaded shank portion 44 and form a tight seal. The collapsing of the female threads 62 against the unthreaded shank portion 44 creates a sealed, interference fit between the unthreaded shank portion 44 and the inner wall of the bore 54 and results in a condition where the unthreaded shank portion 44 tightly seals the bore 54, preventing leakage through the bore 54 in the bushing 30.

The length of the unthreaded shank portion 44 of the adjusting screw member 32 is less than the length of the axial bore 54 including the countersunk passages 56, 58.

Therefore, even when the adjusting screw member 32 is screwed all of the way through the bushing 30 so that the ball portion 36 of the adjusting screw member 32 abuts against the front of the nose portion 48, the threaded shank portion 42 of the screw member 32 maintains engagement within the bore 54. Thus, the adjusting screw member 32 cannot be over adjusted and the male threads on the threaded shank portion 42 will always be in engagement with the bore 54. In addition, a seal, which is formed by the deformed, collapsed threads 62 against the unthreaded shank portion 44, is always maintained between the unthreaded shank portion 44 and the collapsed cold-formed threads 62 in the bore 54.

After rotation of the adjusting screw member 32 in one direction to cause the adjusting screw member 32 to translate in one direction, the adjusting screw member 32 can translate through the bushing 30 in the opposite direction by oppositely rotating the adjusting screw member 32 while always maintaining a seal between the unthreaded shank portion 44 and the collapsed cold-formed threads 62. For example, when the threads on the threaded shank portion 42 contact the threads 62 which have been collapsed by the unthreaded shank portion 44, the male or external threads on the threaded shank portion 42 will create or cold-form new female, internal threads 60 in the bore 54. Thereafter, the adjusting screw member 32 can be rotated so as bring the unthreaded shank portion 44 into contact with the newly formed internal, female threads to re-deform and re-collapse the threads against the unthreaded shank portion 44 to form a seal. This provided for the repeated adjustment of the headlamp adjustor mechanism 20 while maintaining a constant acceptable torque value.

Regarding the specifics of the diameters of the adjusting screw member 32 and the bore 54, the outer diameter B of the unthreaded shank portion 44 is greater than the pitch diameter of the threaded shank portion 42. Preferably, the outer diameter B of the unthreaded shank portion 44 is approximately the same as the crest diameter A of the threaded shank portion 42. The outer diameter B of the unthreaded shank portion 44 may be greater than the crest diameter A of the threaded shank portion 42.

In addition, prior to assembly of the adjusting screw member 32 with the plastic bushing 30, the inner diameter C of the bore 54 is less than the crest diameter A and greater than the pitch diameter of the threaded portion 42 of the adjusting screw member shank 34. Preferably, the inner diameter C of the bore 54 is slightly greater than the pitch diameter of the threaded portion 42. Furthermore, the outer diameter B of the unthreaded shank portion 44 is preferably greater than the inner diameter C of the axial bore 54.

While the outer diameter B of the unthreaded shank portion 44 has been described as preferably being approximately the same diameter as the crest diameter A of the threaded shank portion 42, it is envisioned that the outer diameter B of the unthreaded shank portion 44 could be significantly less than the crest diameter A of the threaded portion 42 so long as when the female threads 60 are cold-formed in the bore 54, enough material is moved around within the bore 54 so that when the unthreaded shank portion 44 contacts the threads 60, the threads 60 will deform and collapse against the unthreaded portion 44 to form a tight seal.

While a preferred embodiment of the present invention is shown and described, it is envisioned that those skilled in the art may devise various modifications of the present invention without departing from the spirit and scope of the appended claims.

The invention claimed is:

1. A headlamp adjustor mechanism for effecting pivotal movement of a movable headlamp component in a headlamp arrangement comprising: a bushing, said bushing having a bore therethrough, said bore being initially unthreaded and having a predetermined inner diameter; and an adjusting screw member for engagement within said bore, said adjusting screw member having a threaded shank portion and an unthreaded shank portion, said threaded shank portion of said adjusting screw member having a predetermined crest diameter, and said unthreaded shank portion having a predetermined outer diameter, said inner diameter of said initially unthreaded bore being sized relative to said crest diameter of said threaded shank portion such that internal threads are created within said bore when said threaded shank portion contacts said bore, said resulting internal threads having a crest diameter sized relative to said outer diameter of said unthreaded shank portion such that said internal threads are collapsed against said unthreaded shank portion when said unthreaded shank portion contacts said internal threads in said bore to seal said bushing against said unthreaded shank portion, thereby deterring entrance of air and/or contaminants through said bore and into an interior of the headlamp arrangement.

2. A headlamp adjustor mechanism as defined in claim 1, wherein said bushing is made of plastic.

3. A headlamp adjustor mechanism as defined in claim 1, wherein said inner diameter of said initially unthreaded bore is sufficiently less than said crest diameter of said threaded shank portion such that said internal threads are created within said bore when said threaded shank portion contacts said bore, and said inner diameter of said initially unthreaded bore is sufficiently less than said outer diameter of said unthreaded shank portion such that said internal threads which are created by contact with said threaded shank portion are collapsed against said unthreaded shank portion when said unthreaded shank portion contacts said internal threads in said bore.

4. A headlamp adjustor mechanism as defined in claim 3, wherein said threaded shank portion has a predetermined pitch diameter, and said inner diameter of said bore is slightly greater than said pitch diameter of said threaded shank portion.

5. A headlamp adjustor mechanism as defined in claim 3, wherein said threaded shank portion has a predetermined pitch diameter, and said outer diameter of said unthreaded shank portion is greater than said pitch diameter of said threaded shank portion.

6. A headlamp adjustor mechanism as defined in claim 3, wherein said outer diameter of said unthreaded shank portion is approximately the same as said crest diameter of said threaded shank portion.

7. A headlamp adjustor mechanism for effecting pivotal movement of a movable headlamp component in a headlamp arrangement comprising: a bushing, said bushing having a bore therethrough, said bore being initially unthreaded and having a predetermined inner diameter; and an adjusting screw member for engagement within said bore, said adjusting screw member having a threaded shank portion and an unthreaded shank portion, said threaded shank portion of said adjusting screw member having a predetermined crest diameter, and said unthreaded shank portion having a predetermined outer diameter, said inner diameter of said initially unthreaded bore being sized relative to said crest diameter of said threaded shank portion such that internal threads are created within said bore when said threaded shank portion contacts said bore, said resulting internal threads having a crest diameter sized relative to said outer diameter of said unthreaded shank portion such that said internal threads are collapsed against said unthreaded shank portion when said unthreaded shank portion contacts said internal threads in said bore to seal said bushing against said unthreaded shank portion, said inner diameter of said initially unthreaded bore is sufficiently less than said crest diameter of said threaded shank portion such that said internal threads are created within said bore when said threaded shank portion contacts said bore, and said inner diameter of said initially unthreaded bore is sufficiently less than said outer diameter of said unthreaded shank portion such that said internal threads which are created by contact with said threaded shank portion are collapsed against said unthreaded shank portion when said unthreaded shank portion contacts said internal threads in said bore, said bore through said bushing has a predetermined length and said unthreaded shank portion of said adjusting screw member has a predetermined length, said length of said unthreaded shank portion being less than the length of said bore through said bushing.

8. A headlamp adjustor mechanism for effecting pivotal movement of a movable headlamp component in a headlamp arrangement comprising: a bushing, said bushing having a bore therethrough, said bore through said bushing being initially unthreaded, hexagonal-shaped and having a predetermined inner diameter; and an adjusting screw member for engagement within said bore, said adjusting screw member having a threaded shank portion and an unthreaded shank portion, said threaded shank portion of said adjusting screw member having a predetermined crest diameter, and said unthreaded shank portion having a predetermined outer diameter, said inner diameter of said initially unthreaded bore being sized relative to said crest diameter of said threaded shank portion such that internal threads are created within said bore when said threaded shank portion contacts said bore, said resulting internal threads having a crest diameter sized relative to said outer diameter of said unthreaded shank portion such that said internal threads are collapsed against said unthreaded shank portion when said unthreaded shank portion contacts said internal threads in said bore to seal said bushing against said unthreaded shank portion.

9. A headlamp adjustor mechanism for effecting pivotal movement of a movable headlamp component in a headlamp arrangement comprising: a bushing, said bushing having a bore therethrough, said bore being initially unthreaded; and an adjusting screw member for engagement within said bore, said adjusting screw member having a threaded shank portion and an unthreaded shank portion, said threaded shank portion of said adjusting screw member forming internal threads within said bore when said threaded shank portion contacts said bore, and said unthreaded shank portion collapsing said resulting internal threads against said unthreaded shank portion when said unthreaded shank portion contacts said internal threads in said bore to seal said bushing against said unthreaded shank portion, said bore through said bushing has a predetermined length and said unthreaded shank portion of said adjusting screw member has a predetermined length, said length of said unthreaded shank portion being less than the length of said bore through said bushing.

10. A headlamp adjustor mechanism as defined in claim 9, wherein said bushing is made of plastic.

11. A method of sealing a headlamp adjustor mechanism which is used to effect pivotal movement of a movable headlamp component in a headlamp arrangement, said method comprising the steps of:

providing a bushing, said bushing having an initially untreaded bore therethrough;

providing an adjusting screw member, said adjusting screw member having a threaded shank portion and an unthreaded shank portion;

rotatably engaging said adjusting screw member through said bore in said bushing to create internal threads within said bore when said threaded shank portion contacts said bore and collapsing the internal threads in said bore against said unthreaded shank portion to seal said bushing against said unthreaded shank portion when said unthreaded shank portion contacts said internal threads in said bore, thereby deterring entrance of air and/or contaminants through said bore and into an interior of the headlamp arrangement.

* * * * *

UNITED STATES PATENT AND TRADEMARK OFFICE
CERTIFICATE OF CORRECTION

PATENT NO. : 5,735,656
DATED : April 7, 1998
INVENTOR(S) : Michael D. Marvell and Adam W. Solberg It is certified that error appears in the above-indentified patent and that said Letters Patent is hereby corrected as shown below:

Column 5, Line 16 "bore" should be -- bore 54. --

Column 5, Line 17 "shank causes" should be -- shank 34 causes --

Column 9, Line 2 "untreaded" should be -- unthreaded --

Signed and Sealed this

Fifteenth Day of September, 1998

*Attest:*

BRUCE LEHMAN

*Attesting Officer*     *Commissioner of Patents and Trademarks*